(12) United States Patent
Melai et al.

(10) Patent No.: US 7,355,373 B2
(45) Date of Patent: Apr. 8, 2008

(54) DC-DC CONVERTER

(75) Inventors: Henri Arnoud Ignatius Melai, Eindhoven (NL); Johan Anton Hendrikx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 178 days.

(21) Appl. No.: 10/558,725

(22) PCT Filed: May 25, 2004

(86) PCT No.: PCT/IB2004/050764

§ 371 (c)(1),
(2), (4) Date: Nov. 30, 2005

(87) PCT Pub. No.: WO2004/107547

PCT Pub. Date: Dec. 9, 2004

(65) Prior Publication Data
US 2007/0029984 A1 Feb. 8, 2007

(30) Foreign Application Priority Data
Jun. 3, 2003 (EP) ................... 03076723

(51) Int. Cl.
*G05F 1/40* (2006.01)
*G05F 1/613* (2006.01)
*H05B 37/02* (2006.01)

(52) U.S. Cl. ...................... 323/282; 323/222

(58) Field of Classification Search ............... 323/222, 323/223, 225, 265, 268, 271, 282, 283, 285, 323/290; 315/209 R, 219, 221, 224, 291, 315/306–308
See application file for complete search history.

(56) References Cited

U.S. PATENT DOCUMENTS

| | | | |
|---|---|---|---|
| 4,546,304 A | 10/1985 | Schwarz | |
| 4,823,023 A | 4/1989 | Shimpo et al. | |
| 5,068,572 A * | 11/1991 | Blankers | 315/209 R |
| 5,604,422 A * | 2/1997 | Peters | 323/222 |
| 5,615,098 A | 3/1997 | Ishii et al. | |
| 5,783,933 A * | 7/1998 | Bailly | 323/282 |
| 6,034,513 A | 3/2000 | Farrington et al. | |
| 6,177,782 B1 * | 1/2001 | L'Hermite et al. | 323/222 |
| 6,222,746 B1 * | 4/2001 | Kim | 363/89 |
| 6,465,991 B1 * | 10/2002 | Chang | 323/222 |
| 6,690,142 B2 * | 2/2004 | Hendrix | 323/222 |
| 6,900,623 B2 * | 5/2005 | Yang et al. | 323/282 |
| 7,180,273 B2 * | 2/2007 | Bocchiola et al. | 323/207 |
| 2002/0131314 A1 | 9/2002 | Watanabe et al. | |

FOREIGN PATENT DOCUMENTS

| | | |
|---|---|---|
| EP | 0517493 A2 | 12/1992 |
| JP | 62105523 | 5/1987 |

* cited by examiner

*Primary Examiner*—Matthew V. Nguyen

(57) ABSTRACT

In an up-converter a switching element is controlled both by an integrated control circuit and by a secondary winding on an inductor. High power factor and low total harmonic distortion are achieved while the design of the integrated control circuit is comparatively simple.

6 Claims, 1 Drawing Sheet

DC-DC CONVERTER

Figure 1:
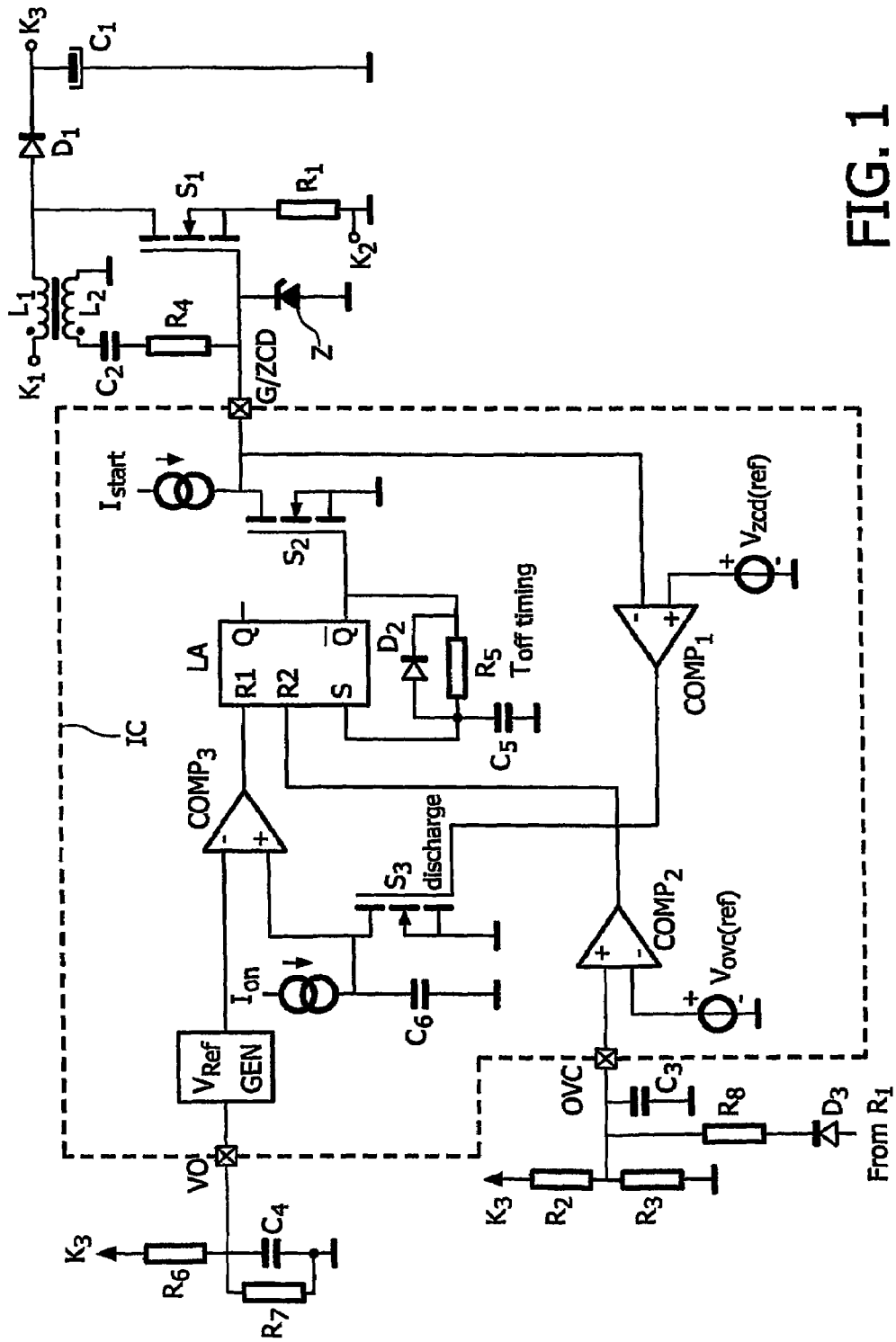

The invention relates to a DC-DC-converter comprising
an inductive element,
a unidirectional element coupled to the inductive element,
a switching element coupled to the inductive element and
the unidirectional element,
control circuitry comprising an integrated circuit and
coupled to a control electrode of the switching element
for alternately rendering the switching element conductive and maintaining the switching element in a conductive state and rendering the switching element non-conductive and maintaining the switching element in a
non-conductive state.

The invention also relates to an electronic ballast circuit
for supplying a lamp.

A DC-DC-converter as mentioned in the opening paragraph is known from Texas Instruments application note
U-132 for the integrated circuit UC3852. In a regular
application the DC-DC-converter is supplied by the mains
supply via a rectifier. In such a regular application the
DC-DC-converter is supplied with a voltage that has the
shape of a rectified sine wave. In order to eLAect a high
power factor and a low THD the control circuitry controls
the conductive state of the switching element in such a way
that the average current drawn from the supply has a shape
that substantially equals the shape of the voltage present at
the input of the DC-DC-converter while the phase shift
between the voltage and the current is substantially zero. In
the known DC-DC-converter, the control of the conductive
state of the switching element is realized entirely by the
integrated circuit. The resulting power factor is high and the
THD is low. However, since the integrated circuit has to
supply all the energy needed to control the switching element the supply part of the integrated circuit is complex and
therefore expensive or more diLAicult to manufacture.

Alternatively it is possible to dispense with the integrated
circuit by equipping the DC-DC-converter with one or more
secondary windings, magnetically coupled with the inductive element, and control the switching element by means of
these secondary windings. Such a DC-DC-converter is disclosed in U.S. Pat. No. 5,440,475. Although the control
circuitry in such a DC-DC-converter is comparatively
simple, it has been found in practice that power factor
correction and THD suppression can often only be realized
to a limited extent, more in particular in applications in
which the amount of power supplied by the DC-DC-converter is adjustable or in case of strong variations of the
amplitude of the mains supply voltage.

The invention aims to provide a DC-DC-converter in
which the control circuitry is comparatively simple and
therefore cheap while the control circuitry yet controls the
switching element in such a way that a comparatively high
power factor is obtained while the THD is comparatively
low.

A DC-DC-converter as mentioned in the opening paragraph is therefore in accordance with the invention characterized in that the control circuitry further comprises a
secondary winding magnetically coupled to the inductive
element and electrically coupled to a control electrode of the
switching element, in that the secondary winding provides
part of the energy for rendering the switching element
conductive directly to the control electrode of the switching
element, in that the switching element is rendered non-conductive by means of a signal generated by the integrated
circuit and is maintained in the conductive and the non-conductive state by a voltage across the secondary winding.

In a DC-DC-converter according to the invention the
control of the switching element is in part realized by means
of the integrated circuit comprised in the control circuitry, so
that accuracy of the control is ensured. However, the energy
necessary for rendering the switching element conductive is
supplied to a large extent by the secondary winding directly
to the control electrode and not via the integrated circuit to
the control electrode so that the supply part of the integrated
circuit only has to supply a limited amount of energy and can
therefore be comparatively simple.

Good results have been obtained for embodiments of a
circuit arrangement according to the invention, wherein the
secondary winding provides all the energy for rendering the
switching element conductive directly at the control electrode of the switching element.

Good results have also been found for embodiments of a
DC-DC-converter according to the invention, wherein the
integrated circuit provides part of the energy for rendering
the switching element conductive. In these embodiments the
energy for rendering the switching element conductive is
supplied by both the secondary winding and the integrated
circuit. As a result, the switching elelement becomes conductive comparatively fast and energy dissipation in the
switching element is thereby limited.

In a DC-DC-converter according to the invention, the
control circuitry is preferably equipped with means for
controlling the switching element in such a way that the
DC-DC-converter operates in the critical mode. In the
critical mode the switching element is rendered conductive
when the current through the inductive element has become
substantially equal to zero. It has been found that energy
losses in this mode of operation are minimized because there
are no reverse recovery losses in the unidirectional element.
In case the DC-DC-converter is operated in the critical mode
and supplied by means of the mains supply via a rectifier, a
good power factor can be obtained by keeping the time lapse
during which the switching element is conductive (the
on-time) at a substantially constant value during half a
period of the mains supply. This is preferably realized by
means of a timer comprised in the control circuitry for
timing the on-time of the switching element and means for
activating the timer by means of the voltage present at the
control electrode of the switching element. When this latter
voltage exceeds a threshold value the timer is started so that
the switching element becomes conductive substantially at
the same moment in time at which the timer is started.
Usually the timer is part of the integrated circuit. An
important advantage is that the signal for starting the timer
and the signal for rendering the switching element non-conductive are exchanged via the same pin of the integrated
circuit, so that the integrated circuit needs only a comparatively small amount of pins.

Because of its simple design and its high power factor and
low THD, a DC-DC-converter according to the invention is
very suitable for use in an electronic ballast circuit for
supplying a lamp.

An embodiment of the invention will be further explained
making use of a drawing. In the drawing, FIG. 1 shows an
embodiment of a DC-DC-converter according to the invention.

In FIG. 1, K1 and K2 are input terminals for connection
to a supply voltage source supplying a DC voltage. In a
regular application the input terminals K1 and K2 are
connected to respective output terminals of a rectifier of
which the input is connected to the mains supply. The DC
voltage that is present between the input terminals K1 and
K2 thus has the shape of a rectified sine wave. Input terminals K1 and K2 are connected by means of a series arrangement of inductive element L1, switching element S1 and ohmic resistor R1. The series arrangement of switching element S1 and ohmic resistor R1 is shunted by a series arrangement of diode D1 and capacitor C1. Diode D1 forms a unidirectional element Terminal K3, forming an output terminal, is connected to a common terminal of diode D1 and capacitor C1. Input terminal K2 also forms an output terminal. A series arrangement of secondary winding L2, capacitor C2 and ohmic resistor R4 is connected between input terminal K2 and a control electrode of the switching element S1. Secondary winding L2 is magnetically coupled with inductive element L1. An input/output terminal G/ZCD of integrated circuit IC is connected to the control electrode of the switching element S1. A zener diode Z for clamping the voltage at the control electrode of the switching element is connected between the control electrode of the switching element and input terminal K2. In FIG. 1 the contents of the IC are discriminated from the rest of the circuitry by means of a dotted line. The input/output terminal G/ZCD is coupled to the output of a current source Istart. A switching element S2 is coupled between the control electrode of switching element S1 and input terminal K2. A control electrode of the switching element S2 is connected to an output terminal of circuit part LA. The output terminal of circuit part LA is connected to a first input terminal S of circuit part LA by means of a resistor R5. The resistor R5 is shunted by a diode D2. A capacitor C5 is connected between the first input terminal S of circuit part LA and input terminal K2. A first input terminal of a comparator COMP1 is connected to the control electrode of switching element S1. A second input terminal of comparator COMP1 is connected to reference voltage source Vzcd(ref). An output terminal of comparator COMP1 is connected to a control electrode of switching element S3. Switching element S3 is connected between input terminal K2 and a first input terminal of comparator COMP3 and is shunted by capacitor C6. The first input terminal of comparator COMP3 is also connected to an output of current source Ion. A second input terminal of comparator COMP3 is connected to an output terminal of circuit part Vrefgen. Circuit part Vrefgen is a circuit part for generating a reference signal that represents the on-time of switching element S1. An input terminal of circuit part Vrefgen is connected to an input terminal VO of the integrated circuit IC. Input terminal VO is also connected to a common terminal of ohmic resistor R6 and capacitor C4. A series arrangement of ohmic resistor R6 and capacitor C4 is connected between terminal K3 and input terminal K2. Capacitor C4 is shunted by ohmic resistor R7. An output terminal of comparator COMP3 is connected to a second input terminal R1 of circuit part LA. Current source Ion, capacitor C6, switching element S3, comparator COMP3 and circuit part Vrefgen together form a timer for timing the on-time of the switching element S1. A series arrangement of ohmic resistors R2 and R3 is connected between terminal K3 and input terminal K2. Ohmic resistor R3 is shunted by capacitor C3. A common terminal of ohmic resistors R2 and R3 is connected to a second input terminal OVC of the integrated circuit IC. A common terminal of switching element S1 and ohmic resistor R1 is also connected to second input terminal OVC by means of a series arrangement of diode D3 and ohmic resistor R7. Second input terminal OVC is connected to a first input terminal of comparator COMP2. A second input terminal of comparator COMP2 is connected to an output of reference voltage source Vovc(ref). An output terminal of comparator COMP2 is connected to a third input terminal R2 of circuit part LA.

The operation of the circuitry shown in FIG. 1 is as follows.

After switch on, a DC voltage is present between input terminals K1 and K2. Immediately after switch on of the DC-DC-converter, switching element S2 is non-conductive and current source Istart supplies a current to the control electrode of switching element S1. As a result the voltage at the control electrode increases and switching element S1 becomes conductive for the first time. A current starts flowing from input terminal K1 to input terminal K2 through inductive element L1, switching element S1 and ohmic resistor R1. Because of the magnetic coupling between inductive element L1 and secondary winding L2, the voltage across inductive element L1 generates a voltage across secondary winding L2 that maintains the switching element S1 in the conductive state. At approximately the same moment in time at which the switching element S1 becomes conductive, the voltage at the control electrode of switching element S1 exceeds the reference voltage generated by reference voltage source Vzcd(ref) and the voltage at the output terminal of comparator COMP1 changes from high to low so that switching element S3 becomes non-conductive and current source Ion starts charging capacitor C6. The voltage present at the output terminal of circuit part Vrefgen represents the on-time of the switching element S1. When the voltage across capacitor C6 exceeds the voltage at the output terminal of circuit part Vrefgen, the voltage at the output terminal of comparator COMP3 changes from low to high. As a result the voltage at the output terminal of circuit part LA changes from low to high so that switching element S2 is rendered conductive and switching element S1 is rendered non-conductive. Since the voltage at the control electrode of switching element S1 is now lower than the reference voltage generated by the reference voltage source Vzcd(ref), the voltage at the output terminal of comparator COMP1 changes from low to high so that switching element S3 is rendered conductive and capacitor C6 is discharged. In other words, the timing circuit formed by current source Ion, capacitor C6, switching element S3, comparator COMP3 and circuit part Vrefgen is reset.

At the same moment in time at which the voltage at the output terminal of circuit part LA changes from low to high, capacitor C5 starts being charged through ohmic resistor R5. Ohmic resistor R5 and capacitor C5 are so dimensioned that the voltage across capacitor C5 and therefore the voltage at the first input terminal of circuit part LA increases very rapidly. When the voltage at the first input terminal S exceeds a treshold value, the voltage at the output terminal of circuit part LA changes from high to low so that capacitor C5 is discharged and switching element S2 is rendered non-conductive again only a short time lapse after it was rendered conductive. As a result switching element S2 is rendered non-conductive before switching element S1 is rendered conductive again. Immediately after switching element S1 has been rendered non-conductive via switching element S2, the current through inductive element L1 flows from input terminal K1 through inductive element L1, diode D1 and capacitor C1 to input terminal K2. The current through inductive element L1 is now decreasing so that the polarity of the voltage across L1 is changed. As a result the polarity of the voltage across secondary winding L2 is also changed so that secondary winding L2 causes the voltage at the control electrode of switching element S1 to be low enough to maintain switching element S1 in a non-conductive state. As a result the switching element S1 is rendered non-conductive by the integrated circuit IC. The switching element S1 is subsequently maintained in a non-conductive state by the secondary winding L2.

While the switching element S1 is non-conductive the current through inductive element L1 decreases subsequently to zero. Because of resonance between inductive element L1 and parasytic capacitances, the polarity of the voltage across the inductive element L1 and therefor the voltage across secondary winding L2 is reversed shortly after the current through inductive element L1 has become zero. These parasytic capacitances exist between a common terminal of the inductive element L1, diode D1 and switching element S1 and the input terminals and output terminals K1, K2 and K3. As a result, switching element S1 is rendered conductive and an increasing current flows once more through inductive element L1, switching element S1 and ohmic resistor R1. The voltage across secondary winding L2 that is generated by the voltage across inductive element L1 maintains the switching element S1 in the conductive state. At the same moment in time at which the switching element S1 is rendered conductive, the on-time timer is activated via comparator COMP1 and the sequence of operational states described here above is repeated. Since the on-time of the switching element S1 is controlled by means of electronics comprised in the integrated circuit IC, the on-time control is comparatively accurate resulting in a high power factor and a low THD. However, the energy to bring the switching element in a conductive state is not supplied by the integrated circuit IC but by the secondary winding L2. As a consequence the integrated circuit IC can have a very simple supply part.

During operation capacitor C4 is charged from capacitor C1 via ohmic resistor R6. At the same time capacitor C4 is discharged by ohmic resistor R7. When the voltage over capacitor C1 increases, the voltage across capacitor C4 being the voltage at input terminal VO increases too. The circuit part Vrefgen generates a lower reference signal when the voltage at input terminal VO is increased so that the on-time of switching element S1 is decreased. The on-time of switching element S1 is increased in a similar way in case the voltage across capacitor C1 and therefor also the voltage at input terminal VO decreases. Thus the voltage across capacitor C1 is maintained at a desired value in spite of changes in the amplitude of the input voltage present between input terminals K1 and K2 or variations in a load connected between output terminals K2 and K3.

In case either the voltage across capacitor C1 and/or the current through resistor R1 increases suddenly, the voltage present at input terminal OVC increases accordingly. When the voltage at input terminal OVC exceeds the voltage generated by reference voltage source Voc(ref), the voltage at the output terminal of comparator COMP2 changes from low to high so that the same is true for the voltage at the second input terminal R2 of circuit part LA. This results in the voltage at the output terminal of circuit part LA changing from low to high so that switching element S1 is rendered non-conductive via switching element S2 and maintained in a non-conductive state as long as the voltage at input terminal OVC is higher than the reference voltage generated by the reference voltage source Voc(ref). The DC-DC-converter is thus protected against the occurrence of high voltages and high currents that might damage the DC-DC-converter.

The invention claimed is:

1. A DC-DC-converter comprising
   an inductive element,
   a unidirectional element coupled to the inductive element,
   a switching element coupled to the inductive element and the unidirectional element,
   control circuitry comprising an integrated circuit and coupled to a control electrode of the switching element for alternately rendering the switching element conductive and maintaining the switching element in a conductive state and rendering the switching element non-conductive and maintaining the switching element in a non-conductive state, characterized in that the control circuitry further comprises a secondary winding magnetically coupled to the inductive element and electrically coupled to a control electrode of the switching element, in that the secondary winding provides part of the energy for rendering the switching element conductive directly to the control electrode of the switching element, in that the switching element is rendered non-conductive by means of a signal generated by the integrated circuit and is maintained in the conductive and in the non-conductive state by a voltage across the secondary winding.

2. A DC-DC-converter according to claim 1, wherein the secondary winding provides all the energy for rendering the switching element conductive directly to the control electrode of the switching element.

3. A DC-DC-converter according to claim 1, wherein the integrated circuit provides part of the energy for rendering the switching element conductive.

4. A DC-DC-converter according to claim 1, wherein the control circuitry is equipped with means for controlling the switching element in such a way that the DC-DC-converter operates in the critical mode.

5. A DC-DC-converter according to claim 4, wherein the control circuitry comprises a timer for timing the on-time of the switching element and means for activating the timer by means of the voltage present at the control electrode of the switching element.

6. Electronic ballast circuit for supplying a lamp and comprising a DC-DC-converter as claimed in claim 1.

* * * * *